United States Patent
Scheppegrell

(12) 
(10) Patent No.: US 9,877,172 B1
(45) Date of Patent: Jan. 23, 2018

(54) OFFENDER MONITOR MESSAGING SYSTEM

(71) Applicant: Numerex Corp., Atlanta, GA (US)

(72) Inventor: David Scheppegrell, Atlanta, GA (US)

(73) Assignee: NUMEREX CORP., Atlanta, GA (US)

( * ) Notice: Subject to any disclaimer, the term of this patent is extended or adjusted under 35 U.S.C. 154(b) by 5 days.

(21) Appl. No.: 15/222,164

(22) Filed: Jul. 28, 2016

(51) Int. Cl.
*H04W 4/00* (2009.01)
*H04W 24/00* (2009.01)
*H04W 4/14* (2009.01)
*H04W 4/02* (2009.01)

(52) U.S. Cl.
CPC ............... *H04W 4/14* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 5,731,757 A | * | 3/1998 | Layson, Jr. .......... | G08B 21/028 340/5.61 |
| 6,014,080 A | * | 1/2000 | Layson, Jr. ........ | G08B 21/0211 340/539.1 |
| 2003/0222781 A1 | * | 12/2003 | Defant .................. | G08B 21/22 340/573.4 |
| 2008/0316023 A1 | * | 12/2008 | Crowl .................... | G08B 21/22 340/539.13 |

* cited by examiner

*Primary Examiner* — Erika Washington
(74) *Attorney, Agent, or Firm* — King & Spalding LLP

(57) ABSTRACT

An officer can utilize an offender monitor to track remotely and manage the whereabouts of an offender, such as someone who as been convicted of a crime and is on parole. The officer can compose and send custom messages to send to the offender via the offender monitor. The offender monitor can store a received message so that the offender can play the message at an appropriate time via pressing a button on the offender monitor or making another input. If the officer deems that a message is urgent or needs to be played immediately, the officer can transmit a command to the offender monitor that causes the message to be played automatically.

19 Claims, 5 Drawing Sheets

OFFENDER MONITOR MESSAGING SYSTEM

TECHNICAL FIELD

The present technology relates generally to offender monitors for tracking locations of offenders, and more particularly to transmitting prioritized messages to offenders via their offender monitors.

BACKGROUND

Situations arise where an officer or other person would like to send a message to an offender who is being monitored by an offender monitor. If the offender is not carrying a conventional cell phone or the offender's cell phone is not operational due to depleted batteries or another issue, then communicating with the offender may not be feasible with conventional technologies.

Accordingly, need exists for communicating reliably with offenders who are being monitored by offender monitors. A technology addressing such a need, or some related deficiency in the art, would improve offender-monitoring programs.

SUMMARY

An offender monitor can remotely track an offender, for example someone who as been convicted of a crime and is on parole or someone who is under a court-ordered restriction. An officer can utilize the tracking capabilities to help manage the offender, for example to confirm that the offender is complying with any restrictions on locations or movements. The officer can compose and send messages to send to the offender via the offender monitor. In one aspect of the disclosure, the offender monitor can store a received message so that the offender can play the message at an appropriate time via pressing a button on the offender monitor or making another input. In another aspect of the disclosure, if the officer determines that a stored message needs to be played immediately, the officer can transmit a command to the offender monitor that causes the stored message to be played. In another aspect of the disclosure, the officer can send a priority message that is automatically played upon receipt by the offender monitor.

The foregoing discussion of offender monitors is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

Figure 1:
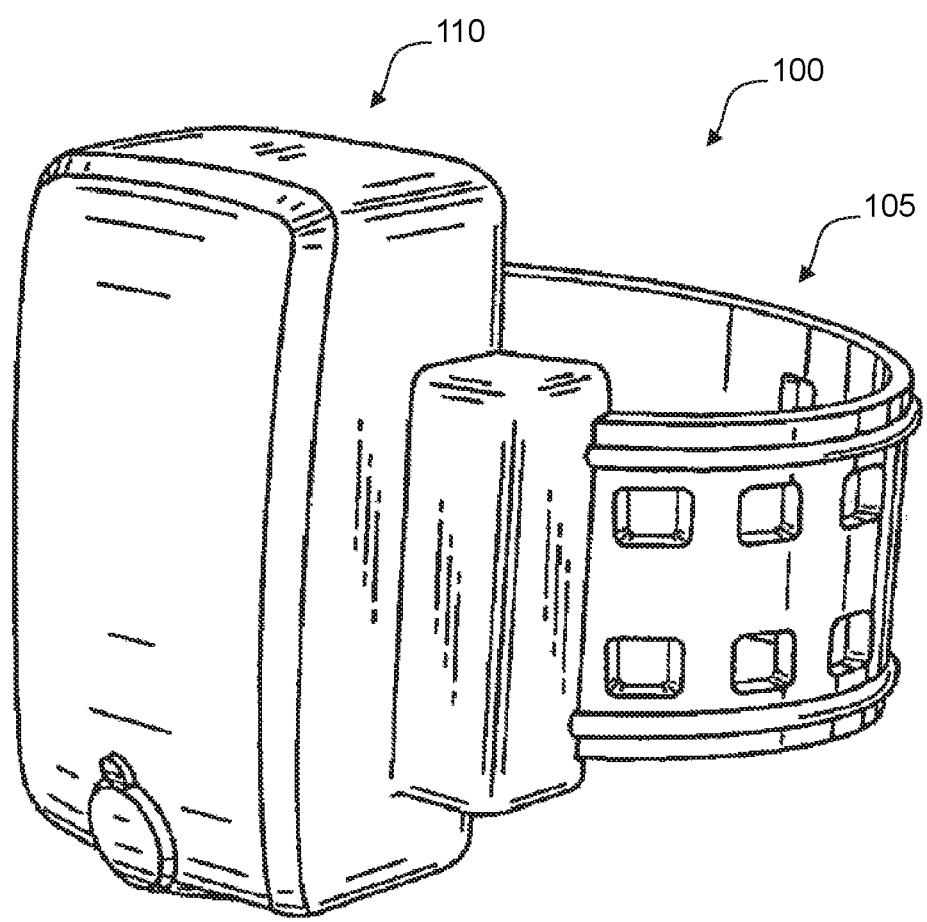
FIG. 1 is an illustration of an offender monitor in accordance with some example embodiments of the present technology.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DESCRIPTION OF EXAMPLE EMBODIMENTS

Some example embodiments of the present technology will be discussed in further detail below with reference to the figures. However, the present technology can be embodied in many different forms and should not be construed as limited to the embodiments set forth herein. Rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Some of the embodiments may comprise or involve processes that will be discussed below. Certain steps in such processes may naturally need to precede others to achieve intended functionality or results. However, the technology is not limited to the order of the steps described to the extent that reordering or re-sequencing does not render the processes useless or nonsensical. Thus, it is recognized that some steps may be performed before or after other steps or in parallel with other steps without departing from the scope and spirit of this disclosure.

Turning now to FIG. 1, this figure illustrates an example offender monitor 100 according to some embodiments of the present technology. The illustrated offender monitor 100 provides a representative, non-limiting example, of a tracking device.

The illustrated offender monitor 100 comprises a strap 105 that extends around an appendage of an offender who is being monitored, for example around the offender's leg. The strap 105 is attached to a housing 110 that encloses electrically powered elements as discussed below. The offender may be a criminal on parole or a person under a government order for monitoring, for example. In example embodiments, the illustrated offender monitor 100 can be characterized as a tracking device for monitoring the movement of an individual.

In some example embodiments, the housing 110 can enclose various components such as one or more batteries, electronic circuitry (e.g., a transceiver, GPS locating circuitry, antenna, microphones, switches that facilitate user input via depression of a button, etc.), optical devices (e.g., a light source, a light receiver, etc.), message delivery components (e.g. a speaker, sound transducer, piezoelectric crystal, vibrator, etc.), and optical connectors. Padding can optionally be provided on the back of the housing 110 to facilitate wearing the offender monitor 100 comfortably around a leg (or an arm) of an individual, for example. In some embodiments, such padding is omitted. The individual can be, for example, an offender who is subject to a restraining order or house arrest from a court or other authority. One end of the strap 105 attaches to the housing 110. In installation, the other end of the strap 105 can be wrapped around the individual's leg and fixed to the housing 110, for example using pins or other fasteners.

In some example embodiments, the offender monitor 100 can be worn as two separate elements. For example, a body-worn element can provide short-range monitoring/communication, while a body-attached element can comprise a cellular radio and a GPS unit.

U.S. Pat. No. 8,115,621, issued Feb. 14, 2012 in the name of Yoganand Rajala and Steve Aninye and entitled "Device for Tracking the Movement of Individuals or Objects" discloses some example embodiments of an offender monitor 100 and is hereby incorporated herein by reference.

Figure 2:
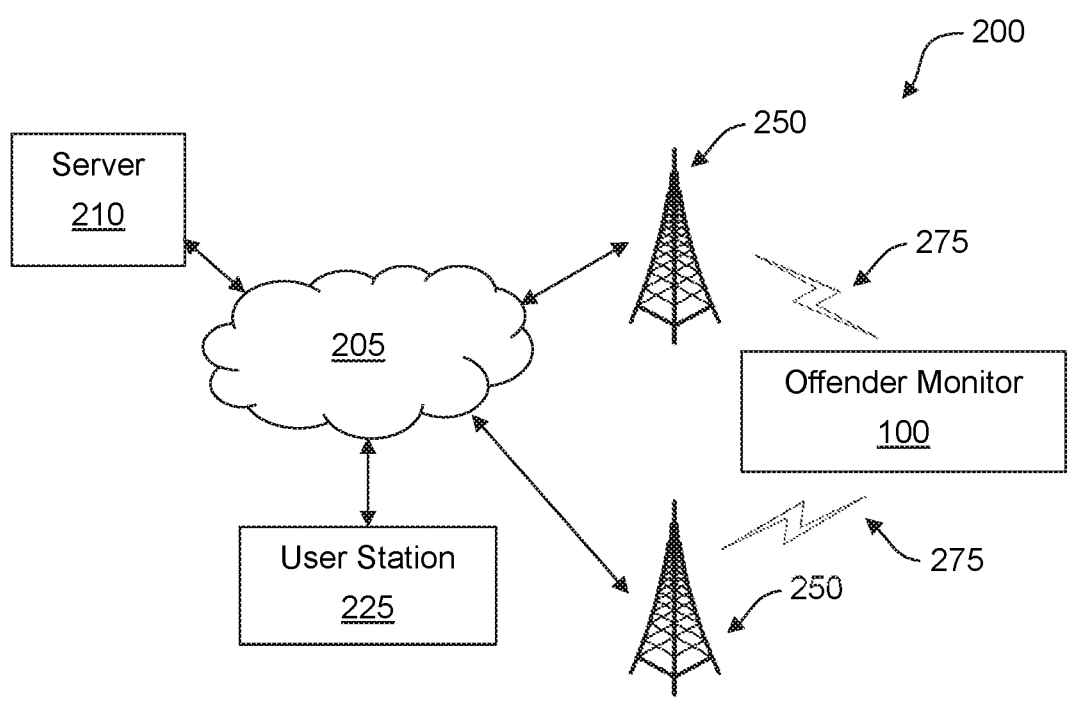
FIG. 2 is an illustration of an operating environment for an offender monitor in accordance with some example embodiments of the present technology.

Turning now to FIG. 2, this figure illustrates an example operating environment for the offender monitor 100 according to some embodiments of the present technology. In the illustrated embodiment, the operating environment comprises a cellular system 200. As illustrated, the offender monitor 100 is located near two cell towers 250 and may communicate with either via respective communication channels 275. The cell towers 250 communicate with a server 210 over a network 205. In some example embodiments, the network 205 comprises the Internet.

A user station 225 is also connected to the network 205. The user station 225 can communicate with the offender monitor 100 through the server 210, or alternatively directly. The user station 225 provides an interface through which a user, for example an officer such as a parole officer or official, can interact with the offender monitor 100 and the server 210. The officer may track offender movements and historical movement patterns through the user station 225, for example. In various embodiments, the user station 225 can comprise a smartphone or other handheld device, a laptop, a workstation, a personal computer, or other appropriate system.

The server 210 can provide location services for the offender monitor 100 as well as for other monitors (not illustrated) that may be attached to other people or objects. Additionally, the server 210 can store configuration data that may be downloaded to the offender monitor 100, such as during startup or rebooting. In an example embodiment, the server 210 may comprise an Internet connection, a processor, and memory. In some example embodiments, the server 210 can comprise a group or cluster of servers acting as a single logical entity.

Figure 3:
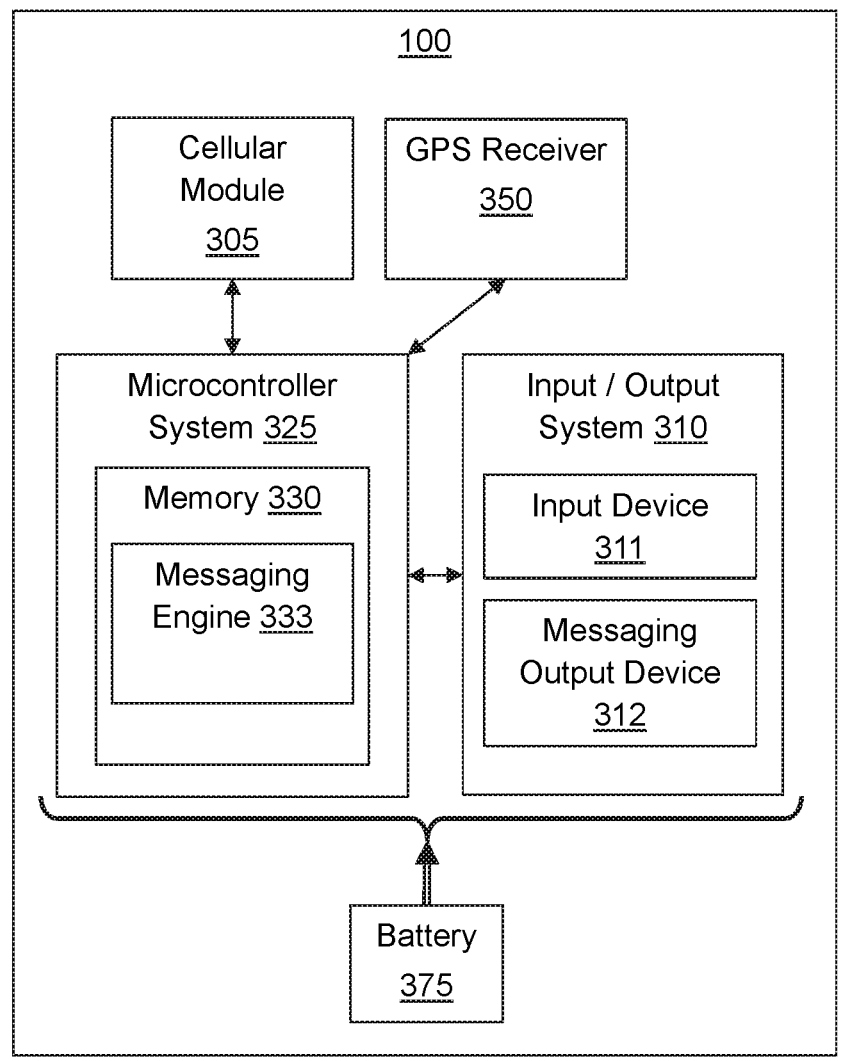
FIG. 3 is a functional block diagram of an offender monitor in accordance with some example embodiments of the present technology.

Turning now to FIG. 3, this figure illustrates a functional block diagram for the example offender monitor 100 according to some embodiments of the present technology. In the illustrated embodiment, the offender monitor 100 comprises a cellular module, a GPS receiver 350, a microcontroller system 325, and an input/output system 310, all of which are powered by one or more on-board batteries 375. The cellular module 305 comprises an example embodiment of a radio. The GPS receiver 350 comprises an example embodiment of a location detector.

In various embodiments, the offender monitor 100 may further comprise gyroscope, a tamper detector, a switch, and other appropriate elements, for example. Example tamper detectors can include switches that open or close to provide an electrical signal when the housing 310 is opened or otherwise breached, fiber optic strands that are embedded in the strap 105 to break and stop transmitting an optical signal when the strap 105 is compromised, and other appropriate tamper sensing devices.

In the illustrated embodiment of FIG. 3, the input/output system 310 comprises an input device 311 and a messaging output device 312. The input device 311 accepts inputs from the offender/user to interact with or control some aspects of the offender monitor 100. The offender can use the input device 311 to access and play messages stored in the offender monitor 100, for example. Example embodiments of the input device 311 can comprise a microphone for receiving voice commands, a button, a touch pad, or some other appropriate device. The messaging output device 312 outputs messages from the offender monitor 100 for receipt by the offender. Example embodiments of the messaging output device 312 can comprise a speaker, a transducer for converting electrical signals into vibrations that can propagate through air as sound, a vibrating component that vibrates in manner that the offender can perceive via feel or tactilely, a light that flashes, or some other appropriate device.

In operation, the cellular module 305 maintains a connection to one or more cell towers 250 over one or more wireless channels 275 through a wireless network as illustrated in FIG. 2. In an example embodiment, the cellular module 305 continuously or regularly attempts to keep a cellular connection available to the tower 250. In such an embodiment, the server 210 can control the operation of the offender monitor 100 by sending commands or other data to the monitor 100. In various embodiments, the cellular module 305 can comprise CDMA, GSM, UMTS, HSPA, or LTE technologies. In some example embodiments, the cellular module 305 and the GPS receiver 350 are integrated into a single modem module or chip or chip set.

When triggered by the microcontroller system 325, a GPS location reading occurs on the GPS receiver 350. That is, the GPS receiver 350 acquires a location reading or GPS data. The microcontroller system 235 can further control the cellular module 305 in connection with transmitting acquired location data (GPS or otherwise), notifications, alarms, and other appropriate data (to the server 210 or other recipient) and with receiving commands and other data. In some embodiments, location information is obtained utilizing cell-tower-based triangulation, such as advanced forward link trilateration (AFLT), or using a signal-strength-based location approach, such as received signal strength indicator (RSSI) based on tower or Wifi signals. The offender monitor 100 can utilize such technologies as embodiments of a location detector to augment or support, or as a substitution for, satellite-based location tracking. Further, GPS tracking can utilize assisted GPS (A-GPS) to improve location acquisition speed.

In an example embodiment, the microcontroller system 325 comprises a low-power microcontroller and associated memory 330. The microcontroller system 325 can comprise a microprocessor or other appropriate processor, for example. Example embodiments of the memory 330 can comprise volatile and nonvolatile memory, such as random access memory (RAM) and flash memory for example. In an example embodiment, the memory 330 can comprise firmware for executing management and control functions. For example, the memory 330 can comprise persistent memory that stores program code, including a messaging engine 333. An example embodiment of the messaging engine 333 comprises computer executable instructions for receiving, processing, and playing prioritized messages on the offender monitor 100. Accordingly, the instructions may be executed by the microcontroller system 325 or other appropriate computer-, controller-, or microprocessor-based system. For example, the messaging engine 333 can comprise code for implementing process 500 that is illustrated in flowchart form in FIG. 5 and discussed below.

Figure 4:
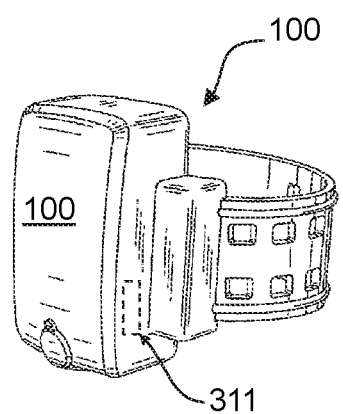
FIG. 4 is an illustration of an offender monitor that comprises a sound transducer for delivering audible messages to an offender in accordance with some example embodiments of the present technology.

Turning now to FIG. 4, this figure illustrates an example of the offender monitor 100 in which the messaging output device 312 is enclosed within and mounted to the housing 110 according to some embodiments of the present technology. In the illustrated embodiment, the housing 110 is waterproof and submersible so that the offender can immerse the offender monitor 100 in water without risk of water incursion damaging the electrical system or internal elements of the offender monitor 100.

As illustrated, the messaging output device 312 comprises a transducer that converts electrical signals conveying a message into vibrational signals conveying the message. In some embodiments, the transducer can comprise a speaker in which the vibrations radiate from the transducer as sound in air. In some examples, the transducer of the messaging output device 312 is mounted to the housing 110 so that the vibrational signals transmit directly to the housing 110, without an air gap. In such an embodiment, the housing 110 vibrates directly from vibrations of the transducer, and the housing vibrations set up vibrations in air that radiate from the housing 110 of the offender monitor 100 as sound. The vibrations can transfer from the transducer to the housing 110 by mounting the transducer to an interior wall or other structure of the housing 110 or by connecting the transducer to the housing structure with a vibration bridge or horn or other solid connection that couples the transducer vibrations into the housing 110 without an air gap.

Figure 5:
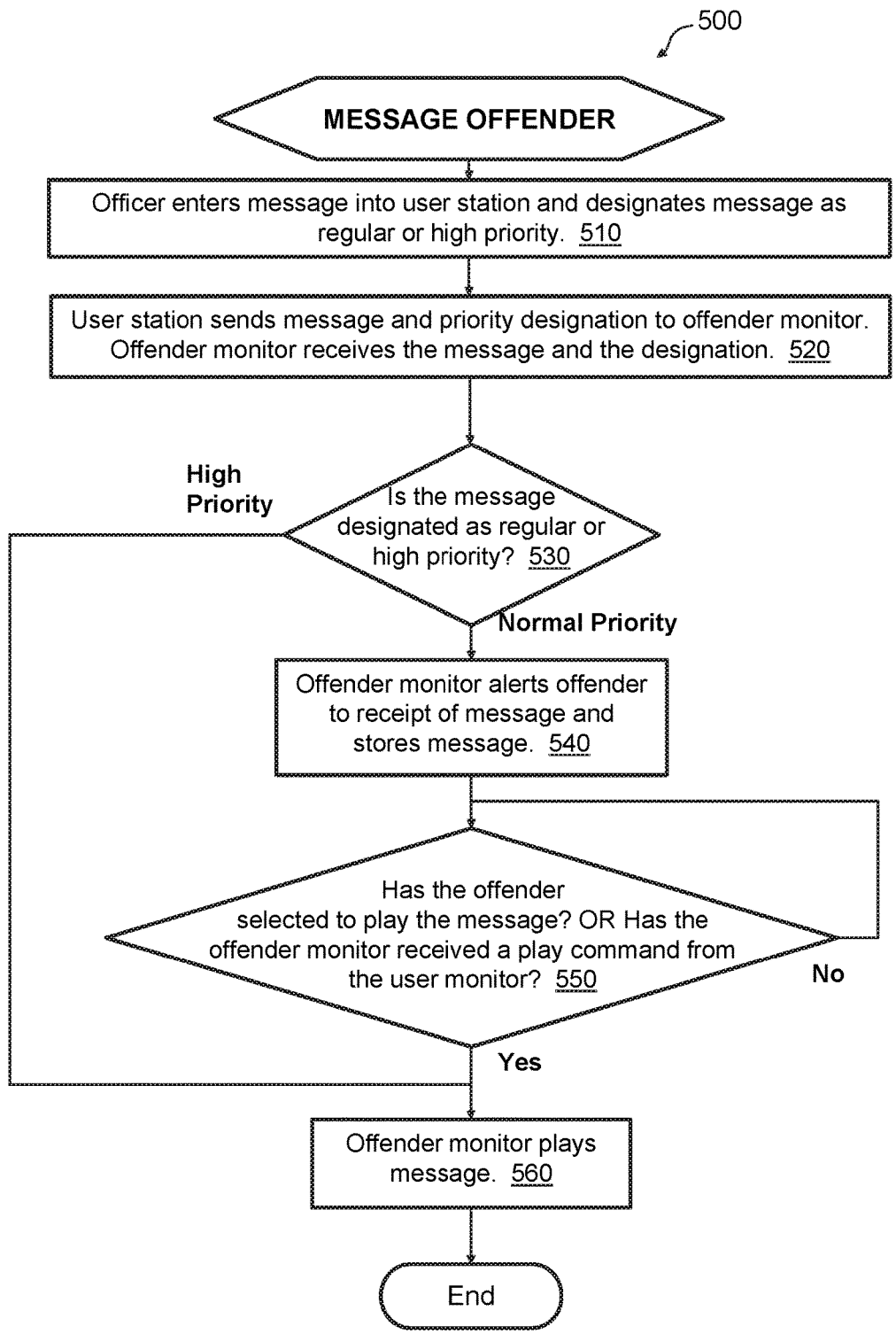
FIG. 5 is a flowchart of a process for messaging an offender who is carrying an offender monitor in accordance with some example embodiments of the present technology.

An example embodiment of a process 500 for messaging an offender will now be described in further detail with reference to the flowchart illustrated in FIG. 5. Example reference will further be made to the preceding figures, without limitation. In some example embodiments, instructions for execution of the process 500 that FIG. 5 describes can be stored in the memory 330 and executed by the microcontroller system 325 of the offender monitor 100. As discussed above, process 500 can comprise an executable embodiment of the messaging engine 333 maintained on the memory 330.

At block 510 of process 500, the officer composes and enters a message into the user station 225 and designates the message as regular or high priority. In various embodiments, the priority designation can be transmitted as a flag, as metadata, or via other appropriate indication of priority. The officer can compose the message via a voice recording or via typing a custom message on a keyboard, for example. In some other embodiments, the officer may select messages from a menu.

At block 520 of process 500, the user station 225 transmits the message to the offender monitor 100, and the offender monitor 100 receives the message. In some embodiments, the message transmits as a wave file. In some other embodiments, the message transmits as an SMS message. The message may be transmitted over a cellular system 200 as illustrated in FIG. 2 and discussed above, for example.

At inquiry block 530 of process 500, the microcontroller system 325 of the offender monitor 100 determines whether the message was transmitted as a high priority message or as regular priority message.

If the message was transmitted as a high priority message, then process 500 branches to block 560. At block 560, the offender monitor immediately plays and delivers the message, without input from the offender. In some embodiments, the offender monitor plays a wave file as a voice recording. In some embodiments, the offender monitor 100 synthesizes speech according to a received SMS message.

In the illustrated embodiment, process 500 ends following execution of block 560. Process 500 can iterate from block 560 to process additional messages sequentially or in parallel, for example.

If the microcontroller system 325 makes a determination at inquiry block 530 that the message was designated as normal priority, then process 500 executes block 540 from block 530 rather branching to block 560.

At block 540, the offender monitor 100 issues a notification to the offender of receipt of the message and stores the message, for example in the memory 330. The offender monitor 100 can notify the offender by vibrating in a manner that the offender perceives via the offender's sense of touch through skin, via an audible beep, via a blinking light, or via some other appropriate output.

At inquiry block 550, the microcontroller system 325 determines whether the offender has selected to play the message (for example via the input device 311 as discussed above) or whether the officer (via the user station 225) has issued a play command received at the offender monitor 100 sometime after receipt of the message and storage of the message. If the offender has not selected to play the message and the offender monitor 100 has not received a play command, then process 500 iterates inquiry block 550 until one of those conditions has been satisfied.

When either the offender has selected to play the message or the officer has issued a play command, then the offender monitor 100 plays the message at block 560 as discussed above, and process 500 ends.

Example embodiments of process 500 support messaging flexibility, so that an officer can avoid interrupting the offender with a non-critical message at an inappropriate time, for example while the offender is at a church service. However, the officer can elect to force playing of a stored message when the officer deems immediate delivery important, for example when the offender is out past a curfew or is in an impermissible location, such as near a victim's residence. The officer can further deliver priority messages for play-on-delivery, when the officer deems immediate delivery is warranted. In another exemplary embodiment of process 500, the messaging feature can be disabled to prevent an exchange of communications between an officer and the offender that are deemed to be confidential or legally privileged communications.

Technology for messaging offenders has been described. From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

What is claimed is:

1. An offender monitor, for monitoring an offender, comprising:
   a battery;
   a location detector;
   a radio;
   a transducer operable to convert electrical energy into vibrational energy;

a processor that is powered by the battery and that comprises:
    a connection to the location detector;
    a connection to the transducer;
    a connection to the radio; and
    memory; and
processor executable instructions stored in the memory to perform the steps of:
    in response to the radio receiving a message, storing the message in the memory and providing a notification for receipt by the offender about the message;
    if an input is received at the offender monitor from the offender, then causing the message that is received at the radio and stored in the memory to be output via the transducer for receipt by the offender; and
    if a command has been received via the radio prior to receiving the input from the offender, then causing the message to be output via the transducer for receipt by the offender.

2. The offender monitor of claim 1, further comprising:
a waterproof housing in which wherein the battery, the location detector, the radio, the transducer, and the processor are disposed; and
a strap that is sized for attaching the waterproof housing to the offender.

3. The offender monitor of claim 2, wherein causing the message to be output via the transducer for receipt by the offender comprises:
    sending electrical signals that convey the message from the radio to the transducer;
    by the transducer, converting the electrical signals into vibrations conveying the message;
    coupling the vibrations from the transducer to the waterproof housing via a direct connection between the transducer and the waterproof housing; and
    by the waterproof housing, producing sound that conveys the message to the offender by coupling the vibrations from the waterproof housing to air adjacent an exterior surface of the waterproof housing.

4. The offender monitor of claim 3, wherein the step of the radio receiving the message comprises the radio receiving an SMS text message that conveys the message.

5. The offender monitor of claim 3, wherein the step of the radio receiving the message comprises the radio receiving a wave file that conveys the message.

6. The offender monitor of claim 3, wherein the input comprises an audible input from the offender.

7. The offender monitor of claim 3, wherein the input comprises a voice command.

8. The offender monitor of claim 3, wherein the input comprises a button entry.

9. The offender monitor of claim 3, wherein the notification comprises a tactilely perceptive vibration.

10. An offender monitor, for monitoring an offender, comprising:
    a battery;
    a location detector;
    a radio;
    a transducer operable to convert electrical energy into vibrational energy;
    a processor that is powered by the battery and that comprises:
        a connection to the location detector;
        a connection to the transducer;
        a connection to the radio; and
        memory; and
    processor executable instructions stored in the memory to perform the steps of:
        in response to the radio receiving a first wireless signal that conveys a message from an officer at a user station, storing the message in the memory; and
        in response to the radio receiving a second wireless signal originating at the user station, immediately retrieving the message from the memory and outputting the message for audible receipt by the offender.

11. The offender monitor of claim 10, wherein the first wireless signal comprises a wave file.

12. The offender monitor of claim 10, wherein the first wireless signal comprises an SMS message.

13. The offender monitor of claim 10, wherein the message from the officer comprises sentences composed by the officer.

14. The offender monitor of claim 10, wherein the message from the officer comprises a voice recording made by the officer.

15. The offender monitor of claim 10, wherein the processor executable instructions stored in the memory are further to perform the step of:
    in response to the radio receiving the first wireless signal that conveys the message from the officer at the user station, causing the offender monitor to emit a notification of the message for receipt by an offender associated with the offender monitor.

16. The offender monitor of claim 10, further comprising:
    a waterproof housing in which the battery, the location detector, the radio, the transducer, and the processor are disposed; and
    a strap that is sized for attaching the waterproof housing to the offender.

17. The offender monitor of claim 16, wherein outputting the message for audible receipt by the offender comprises the transducer causing the waterproof case to vibrate in a manner that produces sound in air outside the waterproof housing.

18. An offender monitor, for monitoring an offender, comprising:
    a battery;
    a location detector;
    a radio;
    a transducer operable to convert electrical energy into vibrational energy;
    a processor that is powered by the battery and that comprises:
        a connection to the location detector;
        a connection to the transducer;
        a connection to the radio; and
        memory; and
    processor executable instructions stored in the memory to perform the steps of
        in response to the radio receiving a wireless signal that conveys a message composed by an officer at a user station,
            converting the wireless signal into an electrical signal that conveys the message,
            converting the electrical signal into an audible signal that conveys the message, and
            outputting the audible signal,
                wherein the wireless signal has a first priority designation, and
        in response to the radio receiving a second wireless signal that has a second priority designation and that conveys a second message composed by the officer at the user station, storing the second message in the memory for retrieval based on an input by the offender into the offender monitor, wherein the first priority designation is higher than the second priority designation.

19. The offender monitor of claim 18, further comprising:

a waterproof housing in which the battery, the location detector, the radio, the transducer, and the processor are disposed; and a strap that is sized for attaching the waterproof housing to the offender.

\* \* \* \* \*